United States Patent
Lee et al.

(10) Patent No.: US 8,147,954 B2
(45) Date of Patent: Apr. 3, 2012

(54) PER-FLUORO POLYETHER COMPOUND, ANTIFOULING COATING COMPOSITION AND FILM CONTAINING SAME

(75) Inventors: Soo Bok Lee, Daejeon (KR); In Jun Park, Daejeon (KR); Jong Wook Ha, Daejeon (KR); Kwang Won Lee, Daejeon (KR); Sang Goo Lee, Jeollabuk-do (KR); Eun Young Park, Daejeon (KR); Eun Kyung Kim, Nonsan-si (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 640 days.

(21) Appl. No.: 12/260,331

(22) Filed: Oct. 29, 2008

(65) Prior Publication Data

US 2009/0155581 A1 Jun. 18, 2009

(30) Foreign Application Priority Data

Dec. 13, 2007 (KR) .................. 10-2007-0130194

(51) Int. Cl.
*G11B 5/64* (2006.01)
*C09J 7/02* (2006.01)

(52) U.S. Cl. ..... 428/336; 427/387; 428/337; 428/411.1; 428/412; 428/447; 428/451; 556/463; 556/488

(58) Field of Classification Search .................. 427/387; 428/337, 429, 411.1, 412, 447, 451; 556/463, 556/488

See application file for complete search history.

(56) References Cited

U.S. PATENT DOCUMENTS

| | | | |
|---|---|---|---|
| 4,678,688 A | 7/1987 | Itoh et al. | |
| 7,196,212 B2 * | 3/2007 | Yamaguchi et al. | 556/463 |

FOREIGN PATENT DOCUMENTS

| | | |
|---|---|---|
| JP | 58-122979 A | 7/1983 |
| JP | 58-167597 A | 10/1983 |
| JP | 2-233535 A | 9/1990 |
| JP | 10-232301 A | 9/1998 |
| JP | 2000-143991 A | 5/2000 |

OTHER PUBLICATIONS

Hill, James T.: "Polymers from Hexafluoropropylene Oxide (HFPO)", *J. Macromol. Sci.-Chem.*, A8(3), pp. 499-520 (1974).

* cited by examiner

*Primary Examiner* — Terressa Boykin
(74) *Attorney, Agent, or Firm* — Frommer Lawrence & Haug LLP; Ronald R. Santucci

(57) ABSTRACT

Disclosed are a perfluoropolyether-modified silane compound, an antifouling coating composition comprising the same, and a film comprising the same. More particularly, the present invention provides a novel perfluoropolyether-modified silane compound of the formula (1) below, an antifouling coating composition comprising the compound and, when coated on the surface of transparent glass or plastic materials, providing superior antifouling property, scratch resistance and durability while maintaining the transparency of the materials, and a film formed by coating the composition and applicable as antireflection film or optical filter of flat panel displays such as lenses, glass windows, liquid crystal displays (LCD), plasma display panels (PDP), organic electro-luminescence (EL) and filed emission displays (FED):

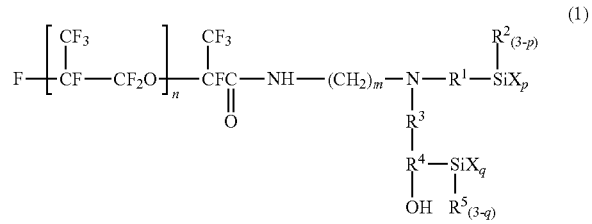

wherein n is an integer of 10 to 70; m is an integer of 1 to 3; p and q are independently 2 or 3; $R^1$ is $C_2$-$C_4$ alkyl; $R^2$ and $R^3$ are independently $C_1$-$C_6$ alkyl or phenyl; $R^4$ is $C_3$-$C_5$ alkyl or $C_3$-$C_6$ alkyl ether; $R^5$ is $C_1$-$C_6$ alkyl or phenyl; and X is $C_1$-$C_3$ alkoxy.

13 Claims, No Drawings

PER-FLUORO POLYETHER COMPOUND, ANTIFOULING COATING COMPOSITION AND FILM CONTAINING SAME

CROSS-REFERENCE TO RELATED APPLICATION

This application claims under 35 U.S.C. §119(a) the benefit of Korean Patent Application No. 10-2007-0130194 filed Dec. 13, 2007, the entire contents of which are incorporated herein by reference.

BACKGROUND (a) Technical Field

The present invention relates to an antifouling coating composition comprising a novel perfluoropolyether-modified silane compound in order to improve antifouling property, scratch resistance and durability, and a film formed by coating the composition.

(b) Background Art

Fluorine-based functional materials are drawing attention worldwide as a core material in the next-generation technology, including optical communications, optoelectronics, semiconductors, automobiles and computer industries. The demand on optical films used in various displays including liquid crystal displays (LCDs) is on the rapid increase. An optical film comprises a liquid crystal or polarizing layer, a hard coat layer to protect the liquid crystal and provide flatness, an antireflection layer to prevent optical interference and provide clear images, and an antifouling layer to prevent surface contamination. Especially, the techniques for fabricating optical films having an antifouling layer are very important from the industrial point of view.

At present, antireflection film is formed of multi-layers of thin inorganic oxide films with very high hydrophilicity for refractive index and thickness control. Thus, it is contaminated easily during use, and the contaminant is not removed easily. In case a solvent is used to remove the contaminant, there is a risk of damaging the surface of the film. In order to provide antifouling property and water repellency to the surface of an optical functional film, glass, etc., a silicone or fluorocarbon polymer is used on the outermost surface to form a cured film.

Examples of the materials used for coating the surface include $C_8F_{17}C_2H_4Si(NH)_{3/2}$, $C_4F_9C_2H_4Si(NH)_{3/2}$ and polysiloxazane [U.S. Pat. No. 4,678,688]. When these compounds are used alone, abrasion durability is deteriorated because of insufficient crosslinking with the inorganic oxide substrate. When only the fluorocarbon is used, satisfactory antifouling property is not attained. When the polysiloxazane compound is used, initial antifouling property is deteriorated because the polysiloxazane has a relatively larger surface energy than the fluorocarbon. Further, sufficient crosslinking may not be attained due to the insufficiency of the functional groups required to form a three-dimensional structure. As a result, contaminants may accumulate or adhere and fingerprints may remain due to low glass transition temperature. In Japanese Patent Publication No. 1990-233535, a silane compound having perfluoro groups is used as a glass surface modifier, but the resultant coating does not exhibit sufficient water repellency, antifouling property and/or nonfouling property.

In order to solve this problem, the so-called silane coupling technique of combining an inorganic material such as glass with an organic material has been proposed. A silane coupling agent has an organic functional radical or a chemical structure with good affinity with an organic material and a reactive alkoxysilyl radical in a molecule. The alkoxysilyl radical undergoes self-condensation reaction with air-borne moisture, converting to a siloxane to form a coating. At the same time, the silane coupling agent forms chemical and physical bonds with the surface of glass or metal, resulting in a durable tough coating. By virtue of these advantages, the silane coupling agent is widely used as a coating agent or a primer to a variety of substrates.

The compounds obtained by introducing perfluoro groups to the silane coupling agent through chemical bonding are disclosed as coating agents with good film formability, adhesivity to substrates and durability [Japanese Patent Laid-open No. Sho 58-167597, Japanese Patent Laid-open Nos. Sho 58-122979, Hei 10-232301 and Hei 2000-143991]. According to the patents, it is mentioned that the introduction of perfluoroalkyl groups on the surface of a substrate having a silane coupling structure improves antifouling properties (water and oil repellency). These compounds, however, fail to have enough oil repellency because the length (molecular weight) of the perfluoro radical portion is restricted, or, in case the perfluoro radical portion is sufficiently long, the proportion taken up by the alkoxysilyl radical in the whole molecule including the perfluoro groups decreases, thereby resulting in poor adhesivity or adhesion durability.

The above information in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art.

An object of the present invention is to provide a novel perfluoropolyether-modified silane compound.

Another object of the present invention is to provide an antifouling coating composition with good antifouling property, adhesion to substrates and durability and a film prepared from the composition.

To achieve the objects, in one aspect, the present invention provides a perfluoropolyether-modified silane compound of the following formula (1):

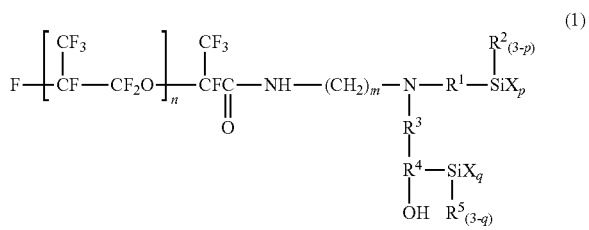

wherein n is an integer of 10 to 70; m is an integer of 1 to 3; p and q are independently 2 or 3; $R^1$ is $C_2$-$C_4$ alkyl; $R^2$ and $R^3$ are independently $C_1$-$C_6$ alkyl or phenyl; $R^4$ is $C_3$-$C_5$ alkyl or $C_3$-$C_6$ alkyl ether; $R^5$ is $C_1$-$C_6$ alkyl or phenyl; and X is $C_1$-$C_3$ alkoxy.

In another aspect, the present invention provides an antifouling coating composition comprising 0.05 to 50 weight % of the perfluoropolyether-modified silane compound of the formula (1) and 50 to 99.95 weight % of a solvent.

In still another aspect, the present invention provides a film formed by coating the antifouling coating composition.

Other aspects of the invention are discussed infra.

DETAILED DESCRIPTION

The present invention relates to a novel perfluoropolyether-modified silane compound of the formula (1), an antifouling coating composition comprising the same, and a film comprising the same.

In the formula (1), n is an integer of 10 to 70, m is an integer of 1 to 3, and p and q are independently 2 or 3. When n is smaller than 10, the perfluoropolyether portion is too short to attain sufficient antifouling property. And, when n exceeds 70, the proportion of the alkoxysilyl portion in the whole perfluoropolyether-modified silane compound decreases, thereby resulting in poor adhesion to the cured film and reduced durability. Also, when p and q are independently smaller than 2, adhesion to the cured film may decrease and durability may be reduced. Hence, the aforesaid ranges are preferred.

Also, in the formula (1), $R^1$ is $C_2$-$C_4$ alkyl, $R^2$ and $R^3$ are independently $C_1$-$C_6$ alkyl or phenyl, $R^4$ is $C_3$-$C_5$ alkyl or $C_3$-$C_6$ alkyl ether, $R^5$ is $C_1$-$C_6$ alkyl or phenyl, and X is $C_1$-$C_3$ alkoxy.

More preferably, a perfluoropolyether-modified silane compound of the following formula (1a), (1b) or (1c) may be used in consideration of antifouling property, transparency, scratch resistance and durability:

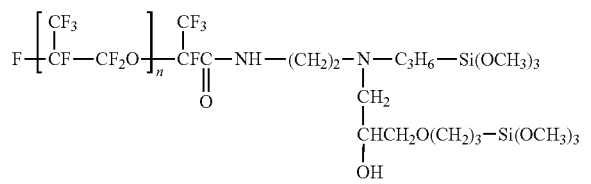

(1a)

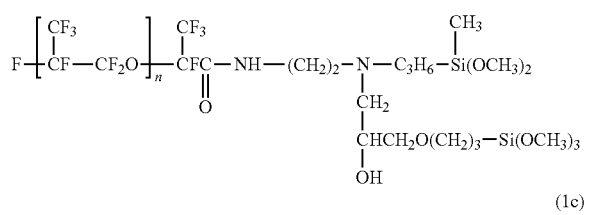

(1b)

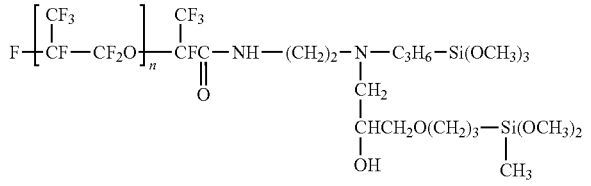

(1c)

wherein n is an integer of 10 to 70.

In the present invention, the perfluoropolyether-modified silane compound may be synthesized by a method commonly used in the art, without particular limitation. For example, it can be synthesized by: a first step of synthesizing a perfluoropolyether compound, a second step of methyl esterifying the perfluoropolyether compound, a third step of mixing the methyl esterified perfluoropolyether compound with an aminosilane compound to introduce an alkoxysilyl portion, and a fourth step of further reacting the secondary amino group of the resultant perfluoropolyether-modified silane compound with an epoxysilane compound. When compared with conventional compounds, the perfluoropolyether-modified silane compound of the present invention has a larger alkoxysilyl portion which improves adhesion to substrates and film formability. Accordingly, provided that polymerization is performed sufficiently to give a large perfluoropolyether portion which exerts antifouling property, the perfluoropolyether-modified silane compound according to the present invention has superior antifouling property as well as good adhesion to substrates and coating durability.

In the first step of synthesizing the perfluoropolyether compound, the perfluoropolyether compound may be synthesized by a previously known method reported in the literature [James T. Hill, *J. Macromol. Sci. Chem.*, A8, (3), p 499 (1974)]. That is, hexafluoropropylene oxide (HFPO) and cesium fluoride are mixed in a solvent. The solvent may be one commonly used in the art and is not particularly limited. For example, a solvent selected from triglyme, tetraglyme, butyl diglyme and ethyl diglyme may be used. The degree of polymerization (i.e., molecular weight) of the perfluoropolyether compound may be controlled by the rate of providing HFPO and the reaction temperature.

In the second step of methyl esterifying the perfluoropolyether compound, the methyl esterification may be performed easily by mixing the perfluoropolyether compound with methanol and stirring at 20 to 30° C. The methyl esterified compound is purified and dried in vacuum. The degree of polymerization can be determined by the molecular weight of the perfluoropolyether compound, which may measured by gel permeation chromatography. The degree of polymerization is equal to the number n in the formula (1), and is an important factor determining antifouling property, adhesion to substrates and durability.

In the third step of reacting the methyl esterified perfluoropolyether compound with an aminosilane compound to introduce an alkoxysilyl portion, the aminosilane compound may be one commonly used in the art and is not particularly limited. For example, one selected from 3-(2-aminoethyl) aminopropyltrimethoxysilane, 3-(2-aminoethyl)aminopropylmethyldimethoxysilane, 3-(2-aminoethyl)aminopropyltriethoxysilane and 3-(2-aminoethyl) aminopropylmethyldiethoxysilane may be used.

More preferably, 3-(2-aminoethyl)aminopropyltrimethoxysilane or 3-(2-aminoethyl)aminopropylmethyldimethoxysilane having good adhesion to coating film is used, in consideration of the curing rate during the coating of the antifouling coating composition comprising the perfluoropolyether-modified silane compound. The aminosilane compound may be mixed in an amount, although not particularly limited, from 1.0 to 3.0 mols, based on 1.0 mol of the methyl esterified perfluoropolyether compound, in a solvent. Preferably, the reaction temperature is maintained at 60 to 80° C., in consideration of the viscosity of the perfluoropolyether compound and the boiling point of the solvent. The solvent also may be one commonly used in the art and is not particularly limited. For example, a solvent selected from trifluorobenzene, 1,3-bistrifluorobenzene and 1,4-bistrifluorobenzene may be used. By purifying the mixture and drying in vacuum, the perfluoropolyether-modified silane compound having an alkoxysilyl portion can be obtained.

In the fourth step of further reacting the secondary amino group of the resultant perfluoropolyether-modified silane compound with an epoxysilane compound, the epoxysilane compound may be one commonly used in the art and is not particularly limited. For example, one selected from 3-glycidoxypropyltrimethoxysilane, 3-glycidoxypropylmethyldimethoxysilane, 3-glycidoxypropyltriethoxysilane, 3-glycidoxypropylmethyldiethoxysilane and 3-(3,4-epoxycyclohexyl)trimethoxysilane may be used. More preferably, 3-glycidoxypropyltrimethoxysilane or 3-glycidoxypropylmethyldimethoxysilane is used in consideration of the film formability exerted by the reactivity of the epoxy group and the reactivity of the alkoxysilyl portion. The epoxysilane compound may be mixed in an amount from 1.0 to 2.0 mols, based on 1.0 mol of the perfluoropolyether-modified silane compound prepared in the third step, in a solvent. The solvent may be one commonly used in the art and is not particularly limited. For example, a solvent selected from trichlorotritrifluoroethane, trifluorobenzene, 1,3-bistrifluorobenzene and 1,4-bis trifluorobenzene. By purifying the mixture and drying in vacuum, the epoxy group of the epoxysilane compound may be introduced to the secondary amino group of the perfluoropolyether-modified silane compound.

Through this method, the perfluoropolyether-modified silane compound of the formula (1) according to the present invention can be synthesized.

The present invention provides an antifouling coating composition comprising 0.05 to 50 weight % of the perfluoropolyether-modified silane compound of the formula (1) and 50 to 99.95 weight % of a solvent.

Further, the present invention also provides an antifouling coating composition which further comprises a hydrolytic catalyst that hydrolyzes the terminal alkoxy group (X) of a perfluoropolyether-modified silane compound represented by the above formula (1). The above hydrolytic catalyst promotes hydrolysis of the alkoxy group (X) thereby facilitating its adhesiveness with a substrate and its subsequent coating when a coating composition is coated on a substrate.

The hydrolytic catalyst to be used in the present invention is not limited to those used in the art to which the present invention pertains. For example, an example of the hydrolytic catalyst to be used in the present invention may be one selected from the group consisting of an organotin compound, an organic titan compound, an organic acid and an inorganic acid, or a mixture thereof. Preferably, organic tin compounds such as dibutyltin dimethoxide, dibutyltin dilaurate, organotitanium compounds such as tetra n-butyl titanate, or organic acids such as methanesulfonic acid, inorganic acids such as hydrochloric acid or sulfuric acid may be used.

The content of the perfluoropolyether-modified silane compound is not particularly limited, and the concentration may be determined in consideration of cotability on the film. In general, the concentration of the modified silane compound may be from 0.05 to 50 weight %, particularly from 0.05 to 20 weight %. The solvent may be one commonly used in the art and may be selected in consideration of coating method, stability of the composition, wetting property on substrates, and rate of evaporation. For example, a fluorine-modified hydrocarbon solvent or hydrocarbon solvent may be used. More preferably, a compound selected from perfluoroheptane, perfluorohexane, m-xyelenehexafluoride, benzotrifluoride, methyl perfluorobutyl ether, ethyl perfluorobutyl ether, perfluoro(2-butyltetrahydrofuran), petroleum benzene, mineral spirits, isoparaffin, toluene, xylene, acetone, methyl ethyl ketone, methyl isobutyl ketone, cyclohexanone, methylglyme, methyltriglyme, methyltetraglyme and tetrahydrofuran or a mixture thereof may be used.

The present invention further provides a film formed by coating the antifouling coating composition.

The coating of the antifouling coating composition may be performed by a method commonly used in the art and is not particularly limited. For example, a previously known method, such as spin coating, dip coating, curtain coating, spray coating, sol-gel method, vacuum deposition, etc., may be used to form an antireflection film or an optical filter for flat panel displays such as lenses, glass windows, liquid crystal displays (LCD), plasma display panels (PDP), organic electro-luminescence (EL) and field emission displays (FED). The coated film may have a thickness in the range from 0.005 to 0.5 μm. When the thickness is smaller than 0.005 μm, antifouling property against water or oil may be insufficient. And, when it exceeds 0.5 μm, light transmittance may decrease and uneven thickness may result in deterioration of reflection properties and interference fringes. Hence, the aforesaid thickness range is preferred.

The film comprising the antifouling coating composition according to the present invention may be provided on the outermost surface of various articles, including inorganic glass or organic polymers. Especially, from the viewpoint of antifouling, it may be used for antireflection film or optical filter in flat panel displays, such as lenses, glass windows, LCDs, PDPs, organic ELs and FEDs, where the contamination of inorganic glass or transparent organic polymers may result in inconvenience. Also, a variety of functional coating layers, including an antistatic layer, an antireflection layer, n electromagnetic interference shield layer, etc., may be disposed between the film and the substrate.

The present invention provides an antifouling coating composition having superior antifouling property, scratch resistance and durability, without sacrificing the surface transparency of glass or plastic materials. Accordingly, it can be coated on glass or plastic products to provide those properties. Specifically, it may be utilized for lenses of eyeglasses, cameras, etc., LCD panels of various products, glass windows of houses, buildings, vehicles, etc., kitchenware and bathroom appliances used in aquatic environment, architectural exterior materials, fine art appliances, and so forth.

EXAMPLES

The present invention is further described with reference to the following examples but they should not be construed as limiting the scope of the present invention.

Synthesis Example 1

2.49 g of tetraglyme, 1.69 g of cesium fluoride, 87.75 g of hexafluoropropylene (HFP) and 420 g of hexafluoropropylene oxide were added in a high pressure stainless steel reactor equipped with a stirrer, a cooling jacket, a thermometer and a pressure gauge. An HFPO oligomer was obtained by performing reaction at −35° C. The total reaction time was 36 hours. $^{19}$F-NMR analysis on the HFPO oligomer resulted in the following spectrum data:

| $^{19}$F-NMR | |
| --- | --- |
| 83.8 ppm | s, 3F, C$\underline{F}_3$CF$_2$ |
| 131.3 ppm | m, 2F, CF$_3$C$\underline{F}_2$ |
| 83.2 ppm | m, 2F, CF$_3$CF$_2$C$\underline{F}_2$ |
| | s, 3F, CF(C$\underline{F}_3$)COF |
| 146.2 ppm | t, 1F, OC$\underline{F}$CF$_3$ |
| 81.6 ppm | m, 3F, OCF(C$\underline{F}_3$)CF$_2$ |
| | m, 2F, OCF(CF$_3$)C$\underline{F}_2$ |
| 132.0 ppm | t, 1F, C$\underline{F}$COF |

After adding 5 g of methanol was to the HFPO, stirring was performed for 12 hours at room temperature to obtain an HFPO oligomer methyl ester. Gel permeation chromatogram (GPC) analysis indicated that the HFPO oligomer methyl ester had a molecular weight $M_W$=4,400 and n was about 26.

Unreacted methanol was removed by drying in vacuum, and 1,3-bis(trifluoromethyl)benzene was added to the HFPO oligomer methyl ester as reaction solvent. Then, 16 g of 3-(2-aminoethyl)aminopropyltrimethoxysilane was added and reaction was performed at 70° C. for 6 hours. After purifying by precipitation in methanol, 1,3-bis(trifluoromethyl)benzene was further added to the reaction product (fluoroaminosilane compound) as reaction solvent, and 20 g of 3-glycidoxypropyltrimethoxysilane was added. After performing reaction at room temperature for 6 hours, purification was performed by precipitation in methanol. The resultant fluorosilane compound had the formula (1a) below. FT-IR analysis resulted in the following spectrum data:

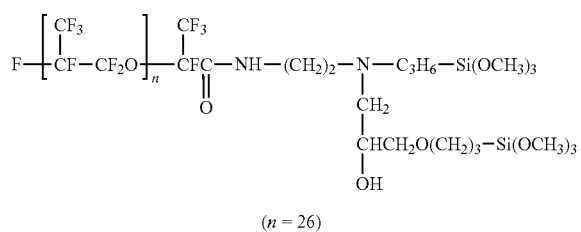

FT-IR (cm$^{-1}$)
3250-3410 (N—H)
2780-3000 (C—H)
1710 (CONH)
1100-1340 (C—F)

Synthesis Example 2

Synthesis was carried out in the same manner as in Synthesis Example 1, except for increasing the amount of hexafluoropropylene oxide during the synthesis of the HFPO oligomer to 800 g.

After adding 5 g of methanol to the HFPO, stirring was performed for 12 hours at room temperature to obtain an HFPO oligomer methyl ester. GPC analysis indicated that the HFPO oligomer methyl ester had a molecular weight $M_W$=8,000 and n was about 48. The following procedure was the same as in Synthesis Example 1. The resultant fluorosilane compound had the following formula (1a):

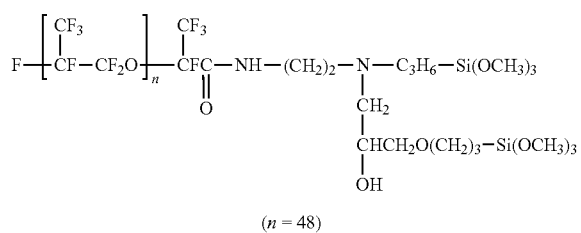

Synthesis Example 3

Synthesis was carried out in the same manner as in Synthesis Example 1, except for adding 15 g of 3-(2-aminoethyl)aminopropylmethyldimethoxysilane instead of 16 g of 3-(2-aminoethyl)aminopropyltrimethoxysilane to the HFPO oligomer methyl ester. The resultant fluorosilane compound had the following formula (1b):

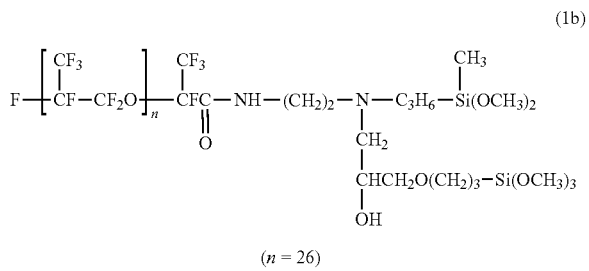

Synthesis Example 4

Synthesis was carried out in the same manner as in Synthesis Example 1, except for adding 17 g of 3-glycidoxypropylmethyldimethoxysilane instead of 20 g of 3-glycidoxypropyltrimethoxysilane to the reaction product (fluoroaminosilane compound). The resultant fluorosilane compound had the following formula (1c):

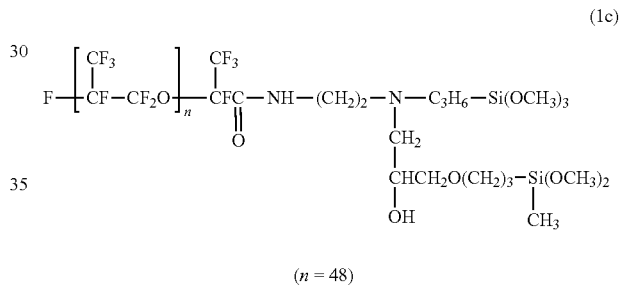

Comparative Synthesis Example 1

Synthesis was carried out in the same manner as in Synthesis Example 1, except for adding 63.25 g of HFP. After adding 5 g of methanol to the reaction product, stirring was performed for 12 hours at room temperature to obtain an HFPO oligomer methyl ester. GPC analysis indicated that the HFPO oligomer methyl ester had a molecular weight $M_W$=12,000 and n was about 72. The other synthesis condition was the same as in Synthesis Example 1. The resultant fluorosilane compound had the following formula (1a):

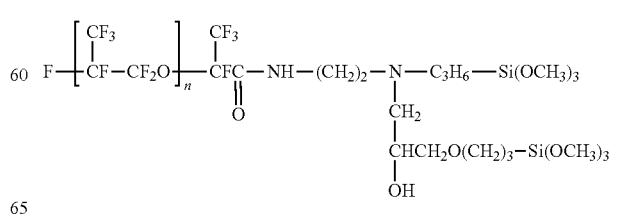

Comparative Synthesis Example 2

Synthesis was carried out in the same manner as in Synthesis Example 1, except for adding 63.25 g of HFP and performing reaction for 9 hours. After adding 10 g of methanol to the reaction product, stirring was performed for 12 hours at room temperature to obtain an HFPO oligomer methyl ester. GPC analysis indicated that the HFPO oligomer methyl ester had a molecular weight $M_W=1,500$ and n was about 9. The other synthesis condition was the same as in Synthesis Example 1. The resultant fluorosilane compound had the following formula (1a):

$$F-[CF(CF_3)-CF_2O]_n-CFC(CF_3)(=O)-NH-(CH_2)_2-N(-C_3H_6-Si(OCH_3)_3)-CH_2-CHCH_2O(CH_2)_3-Si(OCH_3)_3 \quad (1a)$$
$$|\ OH$$
$$(n=9)$$

Comparative Synthesis Example 3

Synthesis was carried out in the same manner as in Synthesis Example 1, except for adding 15 g of 3-aminopropyltrimethoxysilane to the HFPO oligomer methyl ester and performing reaction for at 70° C. for 6 hours. The reaction product (fluoroaminosilane compound) was extracted in 1,3-bis(trifluoromethyl)benzene, without reaction with an epoxysilane compound, and dried in vacuum. The other synthesis condition was the same as in Synthesis Example 1. The resultant fluorosilane compound had the following formula (2):

$$F-[CF(CF_3)-CF_2O]_n-CFC(CF_3)(=O)-NH-(CH_2)_2-NH-C_3H_6-Si(OCH_3)_3 \quad (2)$$
$$(n=26)$$

Examples 1 to 4 and Comparative Examples 1 to 3

0.2 g each of the fluorosilane compounds synthesized in Synthesis Examples 1 to 4 and Comparative Synthesis Examples 1 to 3 and expressed by the formulae 1a, 1b, 1c and 2 was dissolved in 99.8 g of perfluorobutyl ethyl ether (Sumitomo-3 M, Novec HFE-7200 $C_4F_9OC_2H_5$) and spin coated on a slide glass (2.6×7.6×0.1 cm). The spin coating was performed at 2,000 rpm for 30 seconds. After coating, the slide glass was allowed to stand under constant temperature and humidity condition (20° C., 65% RH) for 24 hours to form a cured film.

Comparative Example 4

A bare slide glass was used without any treatment.

Test Examples

Test Example 1

Measurement of Sliding Angle

The slide glass was fixed on a sample stage that can be tilted. Droplets (size 30 μL) of water and n-hexadecane were attached on the surface of the cured film. The slide glass was tilted gradually from a horizontal position (0°). The angle at which the liquid droplet began to slide down was measured. The smaller the sliding angle, the greater is the tendency of removing the liquid drops. A sliding angle of 20° or smaller was determined as allowable.

Test Example 2

Measurement of Contact Angle

Kyowa contact angle meter DCA-WZ was used to measure the contact angles of water and n-hexadecane. Measurement was made at room temperature, and the droplet size was 3 μL. The higher the contact angle, the smaller is the surface energy. Contact angles of 110° or larger (water) and 70° or larger (n-hexadecane) were determined as allowable.

Test Example 3

Evaluation of Contamination Resistance to Pseudo Fingerprint and Ink

A blue oil-based dye (Oil Blue 403) was dissolved in squalene to 5 weight %. An adequate amount was applied on a finger, and the finger was pressed on the cured film surface of the slide glass with a force of 1 kgf for 5 seconds.

Red and line lines were drawn on the cured film surface of the slide glass using commercially available oil-based inks (Pentel). Staining was evaluated by vision examination.

Evaluation Standard for Contamination Resistance
◯: Few stains.
Δ: Slight stains.
X: A lot of stains.

Test Example 4

Ease of Stain Removal

The fingerprints and stains formed in Test Example 3 were wiped off by reciprocating KimWipes 5 times with a force of 1 kgf. The ease of stain removal was evaluated by vision examination.

Evaluation Standard for Ease of Stain Removal
◯: No stain remains.
Δ: Most of stains are removed, but slight trace remains.
X: Stains remain distinctly.

Test Example 5

Evaluation of Durability

Horizontal abrasion (rubbing treatment) was performed using cotton broadcloth at a load of 125 g/cm², using a plane abrasion tester (Yamaguchi Kagaku). The rubbing treatment was performed in two modes: 100 reciprocations and 500 reciprocations. After the rubbing treatment, contact angle, contamination resistance, and ease of stain removal were evaluated as described above.

Evaluation Standard for Contamination Resistance after Rubbing Treatment
○: Few stains.
Δ: Slight stains.
X: A lot of stains.
Evaluation Standard for Ease of Stain Removal after Rubbing Treatment
○: No stain remains.
Δ: Most of stains are removed, but slight trace remains.
X: Stains remain distinctly.
Results are given in Table 1 below.

Further, when applied to antireflection films or optical filters for flat panel displays, such as lenses, glass windows, LCDs, PDPs, organic ELs and FEDs, the antifouling coating composition of the present invention greatly improves contamination resistance and ease of contaminant removal.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

TABLE 1

| | | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
| Sliding angle (°) | Water | 20 | 18 | 18 | 19 | 40 | 17 | 18 | 85 |
| | n-Hexadecane | 14 | 13 | 13 | 14 | 20 | 13 | 14 | 87 |
| Contact angle (°) | Water | 110 | 112 | 110 | 110 | 105 | 110 | 112 | 17 |
| | n-Hexadecane | 70 | 72 | 70 | 70 | 65 | 72 | 69 | 19 |
| Contamination resistance | Pseudo fingerprint | o | o | o | o | o | o | o | X |
| | Oil-based Ink | o | o | o | o | Δ | Δ | o | X |
| Ease of stain removal | Pseudo fingerprint | o | o | o | o | o | Δ | o | X |
| | Oil-based Ink | o | o | o | o | X | Δ | o | X |
| After rubbing 100 times | | | | | | | | | |
| Contact angle (°) | Water | 110 | 112 | 110 | 110 | 103 | 108 | 106 | 17 |
| | n-Hexadecane | 67 | 70 | 68 | 68 | 62 | 68 | 64 | 19 |
| Contamination resistance | Pseudo fingerprint | o | o | o | o | o | o | o | X |
| | Oil-based Ink | o | o | o | o | Δ | Δ | Δ | X |
| Ease of stain removal | Pseudo fingerprint | o | o | o | o | Δ | Δ | | X |
| | Oli-based Ink | o | o | o | o | X | Δ | Δ | X |
| After rubbing 500 times | | | | | | | | | |
| Contact angle (°) | Water | 110 | 112 | 110 | 109 | 102 | 104 | 94 | 17 |
| | n-Hexadecane | 66 | 69 | 67 | 67 | 60 | 61 | 56 | 19 |
| Contamination resistance | Pseudo fingerprint | o | o | o | o | o | o | Δ | X |
| | Oil-based Ink | o | Δ | o | o | Δ | Δ | X | X |
| Ease of stain removal | Pseudo fingerprint | o | o | o | o | o | o | Δ | X |
| | Oil-based Ink | o | o | Δ | Δ | X | X | X | X |

As can be seen from Table 1, the antifouling coating compositions of the present invention (Examples 1 to 4) exhibited superior contamination resistance and outstanding durability against abrasion, compared to when no treatment was carried out (Comparative Example 4).

When the HFPO portion was too long (Comparative Example 1) or too short (Comparative Example 2), durability against abrasion was comparable or worse, and contamination resistance or ease of stain removal was worse.

In Comparative Example 3, contamination resistance or ease of stain removal after rubbing treatment was deteriorated, and durability against abrasion was poor.

The perfluoropolyether-modified silane compound of the formula (1) according to the present invention is very useful as antifouling agent. The antifouling coating composition of the present invention comprising the compound of the formula (1) as main component provides superior antifouling property, scratch resistance and durability, when coated on the surface of transparent glass or plastic substrates, while sustaining the transparency of the substrates.

What is claimed is:

1. A perfluoropolyether-modified silane compound of the following formula (1):

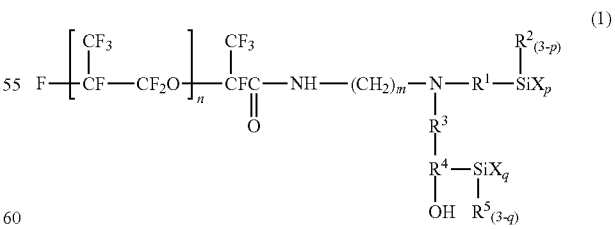

wherein n is an integer of 10 to 70; m is an integer of 1 to 3; p and q are independently 2 or 3; $R^1$ is $C_2$-$C_4$ alkyl; $R^2$ and $R^3$ are independently $C_1$-$C_6$ alkyl or phenyl; $R^4$ is $C_3$-$C_5$ alkyl or $C_3$-$C_6$ alkyl ether; $R^5$ is $C_1$-$C_6$ alkyl or phenyl; and X is $C_1$-$C_3$ alkoxy.

2. The perfluoropolyether-modified silane compound according to claim 1, represented by the following formula (1a), (1b) or (1c):

(1a)
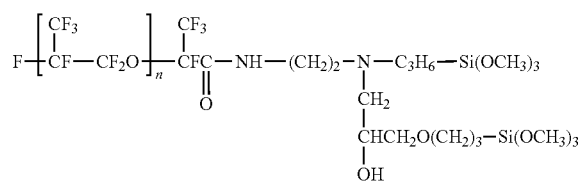

(1b)
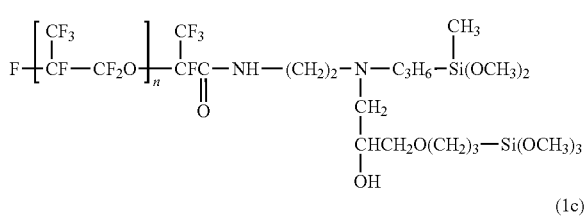

(1c)
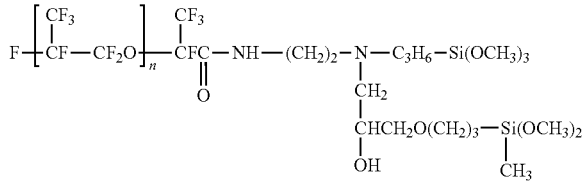

wherein n is an integer of 10 to 70.

3. An antifouling coating composition comprising:
1) 0.05 to 50 weight % of a perfluoropolyether-modified silane compound of the formula (1); and
2) 50 to 99.95 weight % of a solvent:

(I)
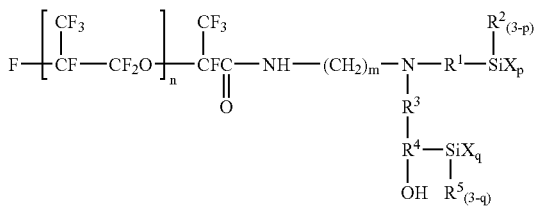

wherein n is an integer of 10 to 70; m is an integer of 1 to 3; p and q are independently 2 or 3; $R^1$ is $C_2$-$C_4$ alkyl; $R^2$ and $R^3$ are independently $C_1$-$C_6$ alkyl or phenyl; $R^4$ is $C_3$-$C_5$ alkyl or $C_3$-$C_6$ alkyl ether; $R^5$ is $C_1$-$C_6$ alkyl or phenyl; and X is $C_1$-$C_3$ alkoxy.

4. The antifouling coating composition according to claim 3, wherein the composition further comprises a perfluoropolyether-modified silane compound of the formula (1) and a hydrolytic catalyst which hydrolyzes the terminal alkoxy group (X) of the perfluoropolyether-modified silane compound.

5. The antifouling coating composition according to claim 3, wherein the solvent is a fluorine-modified hydrocarbon solvent or hydrocarbon.

6. The antifouling coating composition according to claim 5, wherein the solvent is a compound selected from perfluoroheptane, perfluorohexane, m-xyelenehexafluoride, benzotrifluoride, methyl perfluorobutyl ether, ethyl perfluorobutyl ether, perfluoro(2-butyltetrahydrofuran), petroleum benzene, mineral spirits, isoparaffin, toluene, xylene, acetone, methyl ethyl ketone, methyl isobutyl ketone, cyclohexanone, methylglyme, methyltriglyme, methyltetraglyme and tetrahydrofuran or a mixture thereof.

7. A film formed by coating the antifouling coating composition according to claim 3.

8. The film according to claim 7, which has a thickness in the range from 0.005 to 0.5 μm.

9. The film according to claim 7, which is used as antireflection film or optical filter of a flat panel display.

10. The film according to claim 9, wherein the flat panel display is a lens, a glass window, a liquid crystal display (LCD), a plasma display panel (PDP), an organic electroluminescence (EL) or a field emission display (FED).

11. A film formed by coating the antifouling coating composition according to claim 4.

12. A film formed by coating the antifouling coating composition according to claim 5.

13. A film formed by coating the antifouling coating composition according to claim 6.

* * * * *